(12) United States Patent
Frenken et al.

(10) Patent No.: US 10,654,159 B2
(45) Date of Patent: May 19, 2020

(54) TOOL

(71) Applicant: GUSTAV KLAUKE GMBH, Remscheid (DE)

(72) Inventors: Egbert Frenken, Heinsberg (DE); Roman Bobowicz, Remscheid (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 194 days.

(21) Appl. No.: 15/966,496

(22) Filed: Apr. 30, 2018

(65) Prior Publication Data

US 2018/0243895 A1    Aug. 30, 2018

Related U.S. Application Data

(62) Division of application No. 14/403,373, filed as application No. PCT/EP2013/059912 on May 14, 2013, now abandoned.

(30) Foreign Application Priority Data

May 25, 2012    (DE) .......................... 10 2012 104 538

(51) Int. Cl.
*B25F 5/00*    (2006.01)
*B23Q 17/00*    (2006.01)

(52) U.S. Cl.
CPC .............. *B25F 5/00* (2013.01); *B23Q 17/007* (2013.01)

(58) Field of Classification Search
CPC ................................ B25F 5/00; B23Q 17/007
USPC ......................................... 173/213, 216–217
See application file for complete search history.

(56) References Cited

U.S. PATENT DOCUMENTS

| | | | | | |
|---|---|---|---|---|---|
| 311,910 | A | * | 2/1885 | Moeller | ............. E05B 65/0864 |
| | | | | | 292/175 |
| 949,409 | A | * | 2/1910 | Badger | .................. E05B 63/20 |
| | | | | | 292/32 |
| 3,855,851 | A | * | 12/1974 | Paul, Sr. | ............... G01M 15/00 |
| | | | | | 73/114.57 |

(Continued)

FOREIGN PATENT DOCUMENTS

| CN | 2659647 | 12/2004 |
|---|---|---|
| DE | 3742268 | 6/1989 |

(Continued)

OTHER PUBLICATIONS

International Search Report for PCT/EP2013/059912 dated Sep. 14, 2013, 2 pages.

*Primary Examiner* — Robert F Long
(74) *Attorney, Agent, or Firm* — Klintworth & Rozenblat IP LLP

(57) ABSTRACT

A method of operating a hydraulically or electric motor operated tool includes providing a device shaft having electrical contacts; providing an accumulator having an adapter comprising a wall thereon; latching the adapter to the device shaft by a latching part; and engaging a tool with the latching part thereby detaching the adapter from the device shaft, whereupon during engagement of the tool with the latching part, the wall of the adapter is destroyed. When the device shaft and adapter are engaged, walls of the device shaft and adapter form an internal cavity and the latching part is positioned entirely therewithin such that the latching part is completely hidden from view. A hydraulically or electric motor operated tool is also disclosed.

21 Claims, 13 Drawing Sheets

(56) References Cited

U.S. PATENT DOCUMENTS

| | | | |
|---|---|---|---|
| 3,978,186 A * | 8/1976 | Lovejoy | B29C 45/2624 264/102 |
| 3,999,110 A * | 12/1976 | Ramstrom | B23B 45/02 320/112 |
| 4,160,857 A * | 7/1979 | Nardella | H01M 2/105 429/97 |
| 4,220,363 A * | 9/1980 | Foster, Jr. | E05C 1/10 292/164 |
| 4,276,358 A * | 6/1981 | Henson | H01M 2/1005 429/163 |
| 4,391,883 A * | 7/1983 | Williamson | H01M 2/1055 429/100 |
| 4,733,337 A * | 3/1988 | Bieberstein | F21L 2/00 362/157 |
| 4,871,629 A * | 10/1989 | Bunyea | B23B 45/02 429/97 |
| 5,213,913 A * | 5/1993 | Anthony, III | B25F 5/02 292/244 |
| 5,271,536 A * | 12/1993 | Wilson | B65D 47/0819 222/498 |
| 5,318,356 A * | 6/1994 | Shelton | B26B 19/3873 312/223.1 |
| 5,553,675 A | 9/1996 | Pitzen et al. | |
| 5,725,304 A * | 3/1998 | Inai | B25F 5/008 366/108 |
| 6,104,162 A | 8/2000 | Sainsbury et al. | |
| 6,168,881 B1 * | 1/2001 | Fischer | B25F 5/02 292/219 |
| 6,187,471 B1 * | 2/2001 | McDermott | H01M 6/32 429/110 |
| 6,204,632 B1 | 3/2001 | Nierescher et al. | |
| 6,257,351 B1 | 7/2001 | Ark et al. | |
| 6,286,609 B1 | 9/2001 | Carrier et al. | |
| 6,308,378 B1 * | 10/2001 | Mooty | B23D 51/01 16/430 |
| 6,502,949 B1 | 1/2003 | Horiyama et al. | |
| 6,532,790 B2 | 3/2003 | Frenken | |
| 6,729,415 B1 * | 5/2004 | Huang | B25F 5/02 173/170 |
| 6,876,173 B2 | 4/2005 | Mastaler et al. | |
| 6,883,621 B1 * | 4/2005 | Lin | B25F 5/00 173/217 |
| 6,909,260 B2 * | 6/2005 | Parker | H02J 7/0042 320/107 |
| 6,965,214 B2 | 11/2005 | Kubale et al. | |
| 7,007,986 B2 * | 3/2006 | Lodwick, Jr. | E04H 12/003 174/38 |
| 7,254,982 B2 | 8/2007 | Frenken | |
| 7,501,198 B2 * | 3/2009 | Barlev | H01M 2/1022 429/100 |
| 7,540,334 B2 * | 6/2009 | Gass | B23B 31/123 173/171 |
| 7,629,766 B2 | 12/2009 | Sadow | |
| 7,648,383 B2 * | 1/2010 | Matthias | H01M 2/1022 439/352 |
| 7,828,185 B2 * | 11/2010 | Hofmann | H01M 2/1022 173/217 |
| 8,048,552 B1 * | 11/2011 | Mao | H01M 2/1066 429/97 |
| 8,228,029 B2 * | 7/2012 | Meyer | H01M 2/1066 320/112 |
| 8,561,714 B2 * | 10/2013 | Storm | B25D 11/062 173/1 |
| 8,733,470 B2 | 5/2014 | Matthias | |
| 8,733,471 B2 * | 5/2014 | Nagasaka | B25F 5/02 173/217 |
| 2005/0058890 A1 * | 3/2005 | Brazell | H01M 2/1055 429/99 |
| 2005/0153596 A1 | 7/2005 | Vanwambeke et al. | |
| 2005/0191543 A1 * | 9/2005 | Harrington | H01M 2/024 429/65 |
| 2005/0218867 A1 | 10/2005 | Phillips et al. | |
| 2005/0280393 A1 | 12/2005 | Feldmann | |
| 2006/0091858 A1 | 5/2006 | Johnson et al. | |
| 2006/0222930 A1 * | 10/2006 | Aradachi | H01M 2/1055 429/96 |
| 2006/0222931 A1 * | 10/2006 | Lin | B25F 5/02 429/100 |
| 2006/0228936 A1 | 10/2006 | Chen | |
| 2007/0007026 A1 * | 1/2007 | Hofmann | B24B 23/02 173/216 |
| 2007/0227310 A1 | 10/2007 | Roehm et al. | |
| 2007/0257130 A1 * | 11/2007 | Butler | A61L 9/127 239/47 |
| 2008/0135272 A1 | 6/2008 | Wallgren | |
| 2009/0145945 A1 * | 6/2009 | Heinzen | B25F 5/02 227/9 |
| 2009/0236162 A1 * | 9/2009 | Takasaki | B60K 1/04 180/68.5 |
| 2009/0246608 A1 * | 10/2009 | Wu | H01M 2/1022 429/100 |
| 2010/0136402 A1 * | 6/2010 | Hermann | H01M 2/1077 429/120 |
| 2010/0181966 A1 * | 7/2010 | Sakakibara | H01M 10/441 320/136 |
| 2010/0218967 A1 | 9/2010 | Ro Kamp | |
| 2011/0056717 A1 | 3/2011 | Herisse | |
| 2011/0133496 A1 * | 6/2011 | Cooper | B25F 5/02 292/341.15 |
| 2011/0147031 A1 | 6/2011 | Matthias et al. | |
| 2011/0198103 A1 | 8/2011 | Suzuki | |
| 2011/0220381 A1 | 9/2011 | Friese et al. | |
| 2012/0045678 A1 * | 2/2012 | Hayashi | H01M 2/1022 429/100 |
| 2013/0091905 A1 * | 4/2013 | Brown | E05B 73/0017 70/15 |
| 2013/0240231 A1 | 9/2013 | Storz et al. | |
| 2015/0165614 A1 * | 6/2015 | Frenken | B23Q 17/007 173/2 |
| 2015/0207119 A1 * | 7/2015 | Onodera | H01M 2/1077 429/89 |
| 2016/0293914 A1 * | 10/2016 | Miller | H01M 2/1083 |
| 2019/0081297 A1 * | 3/2019 | Nakamori | B60K 1/04 |
| 2019/0232478 A1 * | 8/2019 | Zawisza | B25D 11/005 |
| 2020/0024867 A1 * | 1/2020 | Lee | E05B 47/063 |

FOREIGN PATENT DOCUMENTS

| | | |
|---|---|---|
| DE | 102006058825 | 7/2007 |
| EP | 1833137 | 9/2007 |
| EP | 2200145 | 6/2010 |
| EP | 2562894 | 2/2013 |
| GB | 2431433 | 4/2007 |
| JP | 2011 229317 | 11/2011 |
| WO | 99/19947 | 4/1999 |
| WO | 03/084719 | 10/2003 |
| WO | 2007/058596 | 5/2007 |

* cited by examiner

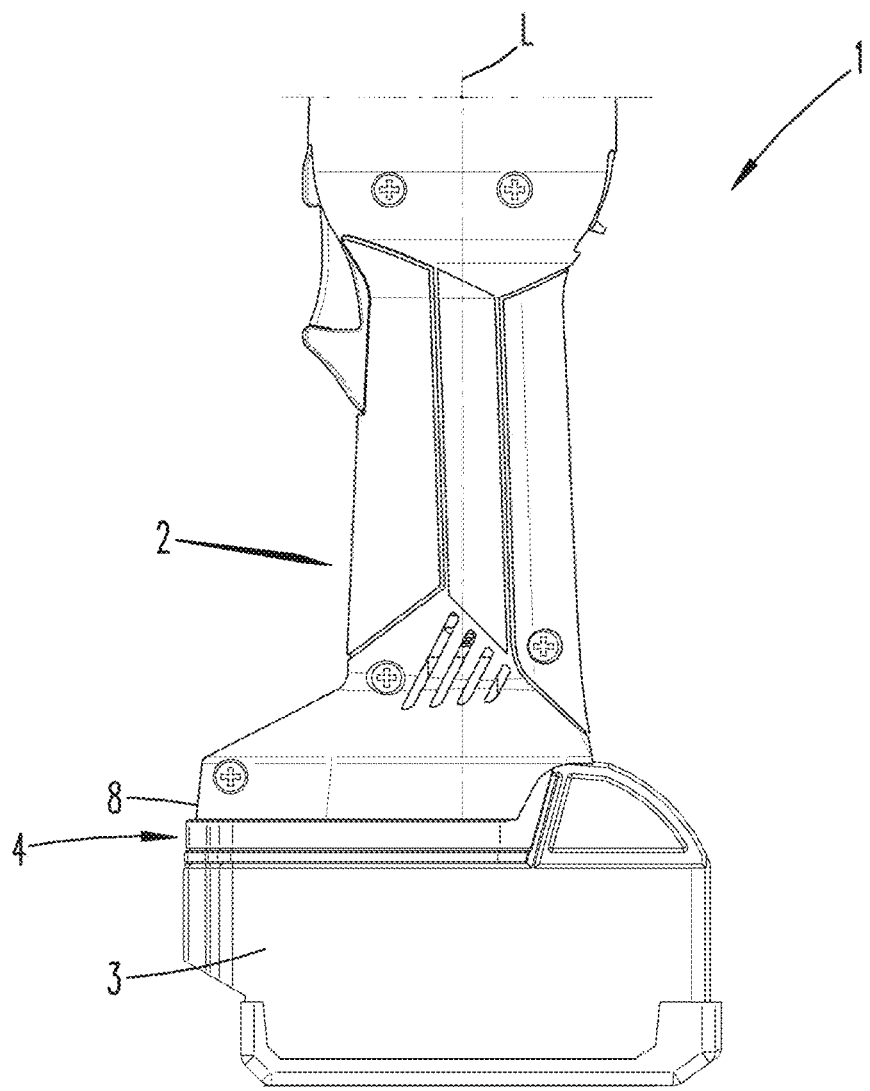

TOOL

RELATED APPLICATIONS

This application is a divisional application of U.S. Ser. No. 14/403,373, filed on Nov. 24, 2014, which is incorporated by reference herein in its entirety.

FIELD OF THE DISCLOSURE

The invention relates to a hydraulically or electric motor operated tool, for example a crimping device, with a device shaft that exhibits at least a first and second electrical contact, and with an accumulator that can be latched with the device shaft, wherein an adapter that can be secured by a latching connection to the device shaft and accumulator is provided on the device shaft between the device shaft and accumulator.

BACKGROUND OF THE DISCLOSURE

Such tools, in particular also in the form of hydraulically or electric motor operated tools, are already known from a variety of standpoints. For example, reference is made to WO 99/19947 A or U.S. Pat. No. 6,532,790 B2, WO 03/084719 A2 or U.S. Pat. No. 7,254,982 B2. Reference is further made to a prior art according to DE 10 2006 058 825 A1 or U.S. Pat. No. 6,965,214 B2.

In known adapters, it is often regarded as disadvantageous that the adapters can easily be detached from the device again.

SUMMARY

Proceeding from the mentioned prior art, the object of the invention is to indicate a favorable connection between an adapter and a device shaft of such a device.

A method of operating a hydraulically or electric motor operated tool includes providing a device shaft having electrical contacts; providing an accumulator having an adapter comprising a wall thereon; latching the adapter to the device shaft by a latching part; and engaging a tool with the latching part thereby detaching the adapter from the device shaft, whereupon during engagement of the tool with the latching part, the wall of the adapter is destroyed. When the device shaft and adapter are engaged, walls of the device shaft and adapter form an internal cavity and the latching part is positioned entirely therewithin such that the latching part is completely hidden from view. A hydraulically or electric motor operated tool is also disclosed.

In a first inventive idea, one possible way of achieving this object involves a tool in which emphasis is placed upon only being able to release the latched connection with the device shaft by acting on a detaching part situated inside the adapter. Inside the adapter here means that it is otherwise recessed in relation to the outer wall, toward the inside. This initially yields at least a hidden position for a trigger part that can be used to release the latched connection with the device shaft.

Another way of achieving the object provides that it not be possible to release the latched connection between the adapter and device without destroying part of the adapter. This makes it extremely easy to equip a device shaft with an adapter, providing the user with a quasi-fixed configuration. Without destroying the adapter, he or she can only operate the device modified in this way with the accumulator that fits on the adapter.

For example, such a solution is advantageous if a device manufacturer wishes to configure the devices with an eye toward several possible accumulators at the request of the customer, but a customer wants to continue working with an accumulator once it has been selected. When changing out or recharging the accumulator, the adapter should not be detached if at all possible, so as to avoid disruptions.

In particular with regard to the first solution mentioned, it can also be preferably provided that the latched connection can only be released by a tool that engages into the interior of the adapter. In a first solution, for example, a detaching part can be actuated by inserting a finger into the hidden position, thereby causing the latched connection to be released, while the second solution can provide that this can only be done with a tool, for example a screwdriver. An opening in the adapter exposing such a detaching part for actuation purposes can be given so small a design as to only allow a screwdriver head that is clearly smaller than the fingertip of a conventional user to fit through, for example.

Another problem associated with such adapters lies in the fact that, aside from the electrical contacts for electrical power transmission, i.e., an electrical plus and electrical minus contact, the accumulators also exhibit contacts with which certain information from the accumulator can be called up and evaluated in the device, e.g., relating to the charging status and/or temperature of the accumulator. Such information can also be of importance in a charging device, for example, and read out there via the mentioned contacts.

Proceeding from this prior art, the object of the invention is also to configure a tool of the kind indicated so that it allows a favorable evaluation of an accumulator regardless of whether an adapter is used.

This object is achieved in a tool where it is provided that at least the side of the adapter facing the accumulator exhibits contacts for acquiring and, if needed, transmitting values about the temperature and/or charging status, potentially also as relates to individual cells of the accumulator. If these contacts are only formed on the side of the accumulator, the adapter itself can already incorporate an evaluator circuit, which also has display means that can outwardly display an impermissible temperature and/or a specific charging status or a drop below a specific charging status, for example.

Values can be transmitted using conventional electrical conducting paths. However, this can also take place optically, magnetically, by radio and/or mechanically, at least in places.

In addition, the object of the invention is also to favorably design a tool of the kind mentioned exhibiting an adapter for connection to an accumulator in such a way as to prevent potential adverse effects caused by accumulator malfunctions.

This object is achieved in a tool where the emphasis is placed on designing the adapter to interrupt the power supply to the crimping device. This is especially important in cases where, as already basically explained, an impermissibly high temperature relative to the accumulator has been detected and/or a temperature rise has been detected indicating the probability of an impermissibly high temperature having been reached and/or a short circuit has been detected and/or possible other events that indicate that the power supply to the tool should be immediately deactivated.

Above and beyond its function to connect the accumulator with the device via different interfaces, the adapter is hence also designed to assume a safety function.

Another object is to ensure a favorable charging process. To this end, the invention proposes that the adapter along with the coupled accumulator be capable of docking with a charging device in such a way that the accumulator is connected with the charging device by means of the adapter. The adapter is here used to transmit the charging current from the charging device to the accumulator so as to charge the latter.

Additional features of the invention are described or depicted below, to include the description of the figures and the drawing, often as relates to their preferred allocation to the already elucidated concept. However, they can also be important as allocated to just one or more individual features, which are described or graphically depicted herein, or independently or in relation to some other overall concept.

It is further preferred that the power switch be configured in such a way as to automatically shut down as a function of an accumulator condition datum. As already explained, a condition date can be a temperature detected in the accumulator and/or a charging status of the accumulator or the like.

In conjunction with one or more of the previously described embodiments, or with regard to the kind of adapter alluded to here as such, it can preferably also be provided that the adapter be designed to output a signal, for example a light and/or audio signal. For example, a signal can also be output with respect to a detected elevated temperature and/or a detected specific charging status and/or a short circuit or a similar event.

BRIEF DESCRIPTION OF THE DRAWINGS

The invention is also described below based upon the attached drawing, wherein the latter only depicts exemplary embodiments. Shown here on:

FIG. 14 is a side view of a device shaft coupled with an adapter and accumulator according to FIG. 11.

DETAILED DESCRIPTION OF THE ILLUSTRATED EMBODIMENTS

Figure 1:
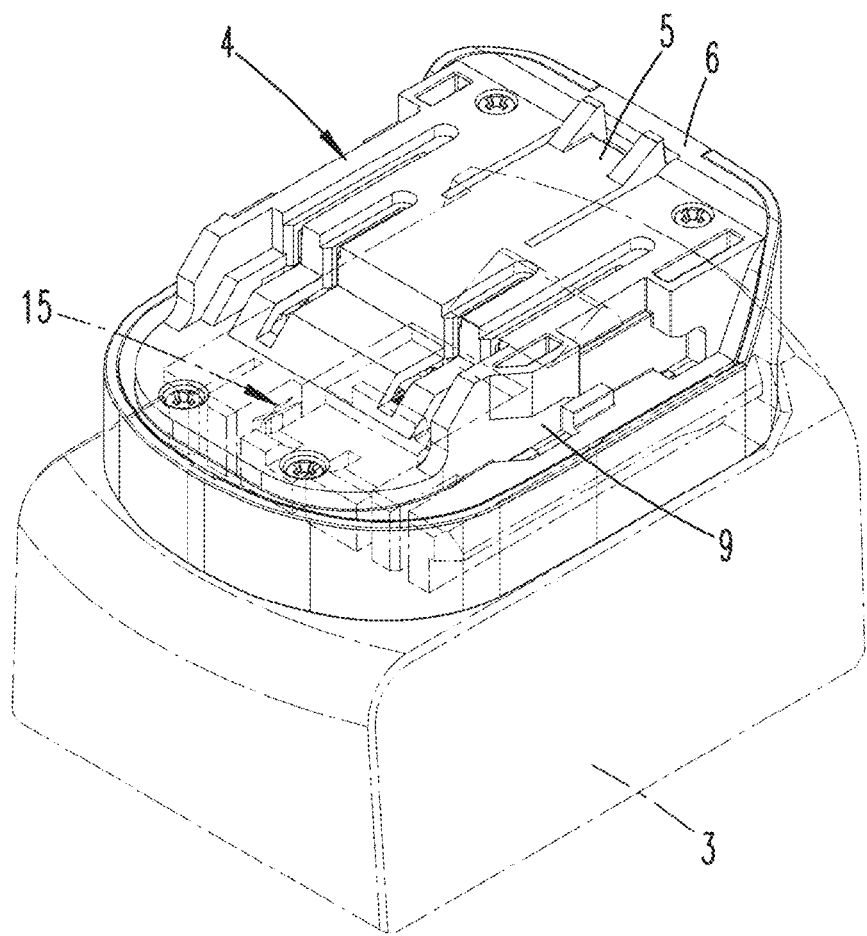
FIG. 1 is a top view of an adapter with an accumulator coupled to its lower side.
Figure 2:
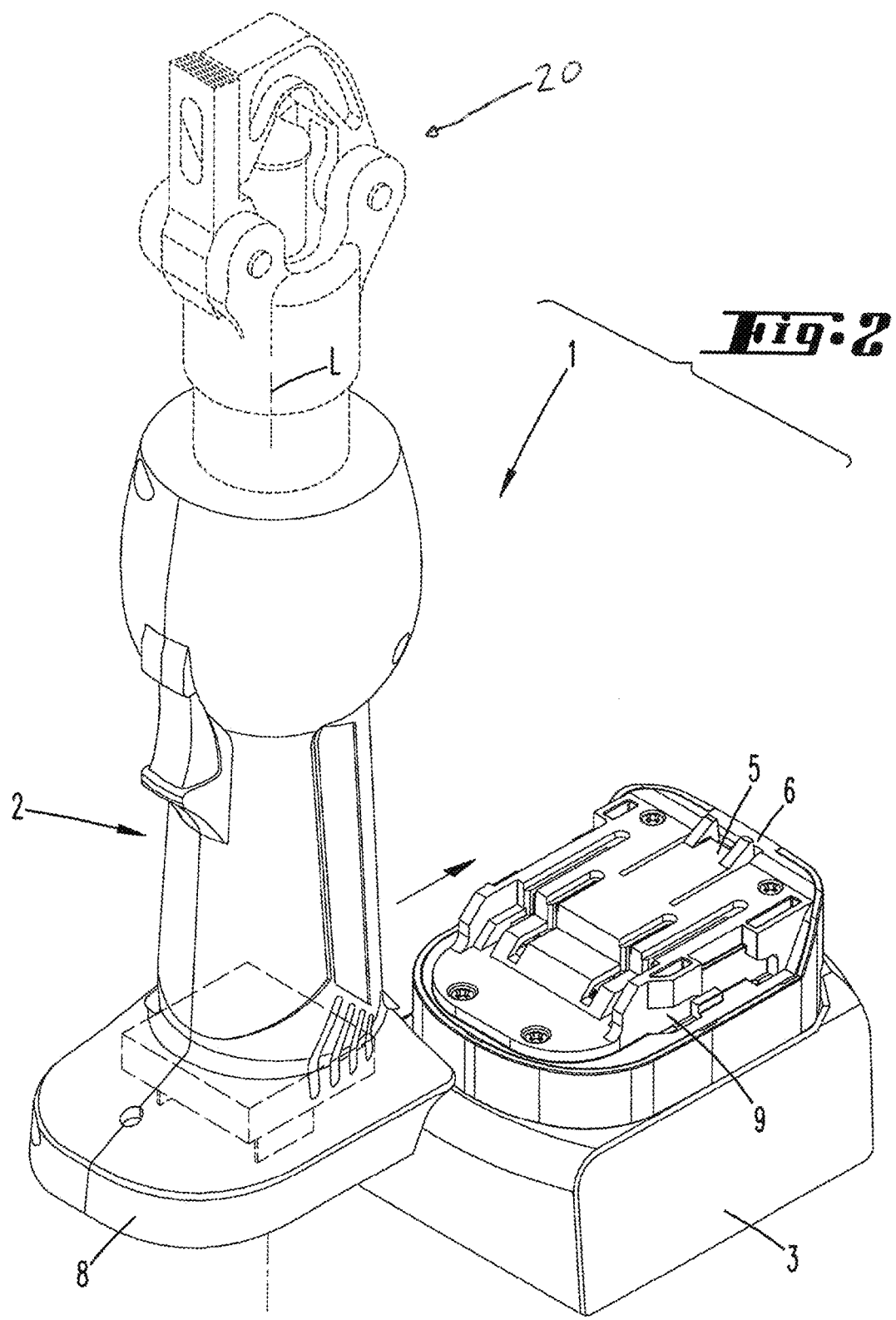
FIG. 2 is a possible connection of a device with an adapter and accumulator located thereon.
Figure 3:
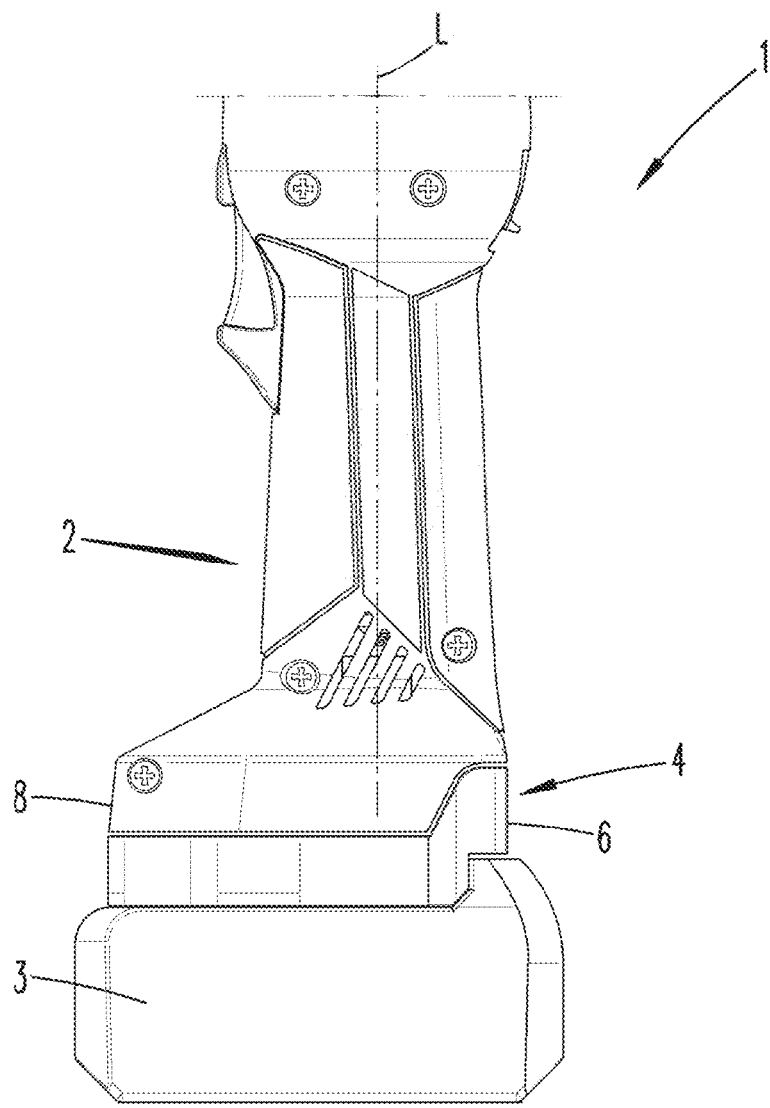
FIG. 3 is the assembled device shaft with adapter and accumulator.
Figure 4:
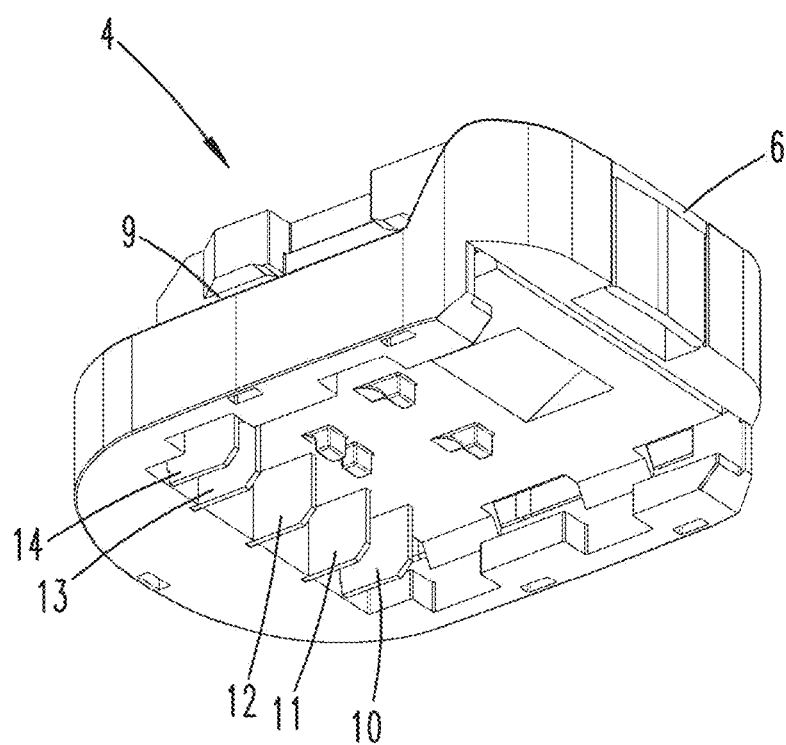
FIG. 4 is a perspective view of an adapter from below.

Depicted and described initially with reference to FIGS. 1 to 3 is a tool 1 only partially shown here that exhibits a device shaft 2 with which an accumulator 3 can be joined via an adapter 4. The adapter 4 can be adjusted to the configuration of a first accumulator 3. The device shaft 2 can be adjusted to the configuration of a second accumulator 3, which then can be joined directly with the device shaft 2 without the adapter 4. FIG. 2 shows the tool as a crimping device having a crimping head 20.

Figure 6:
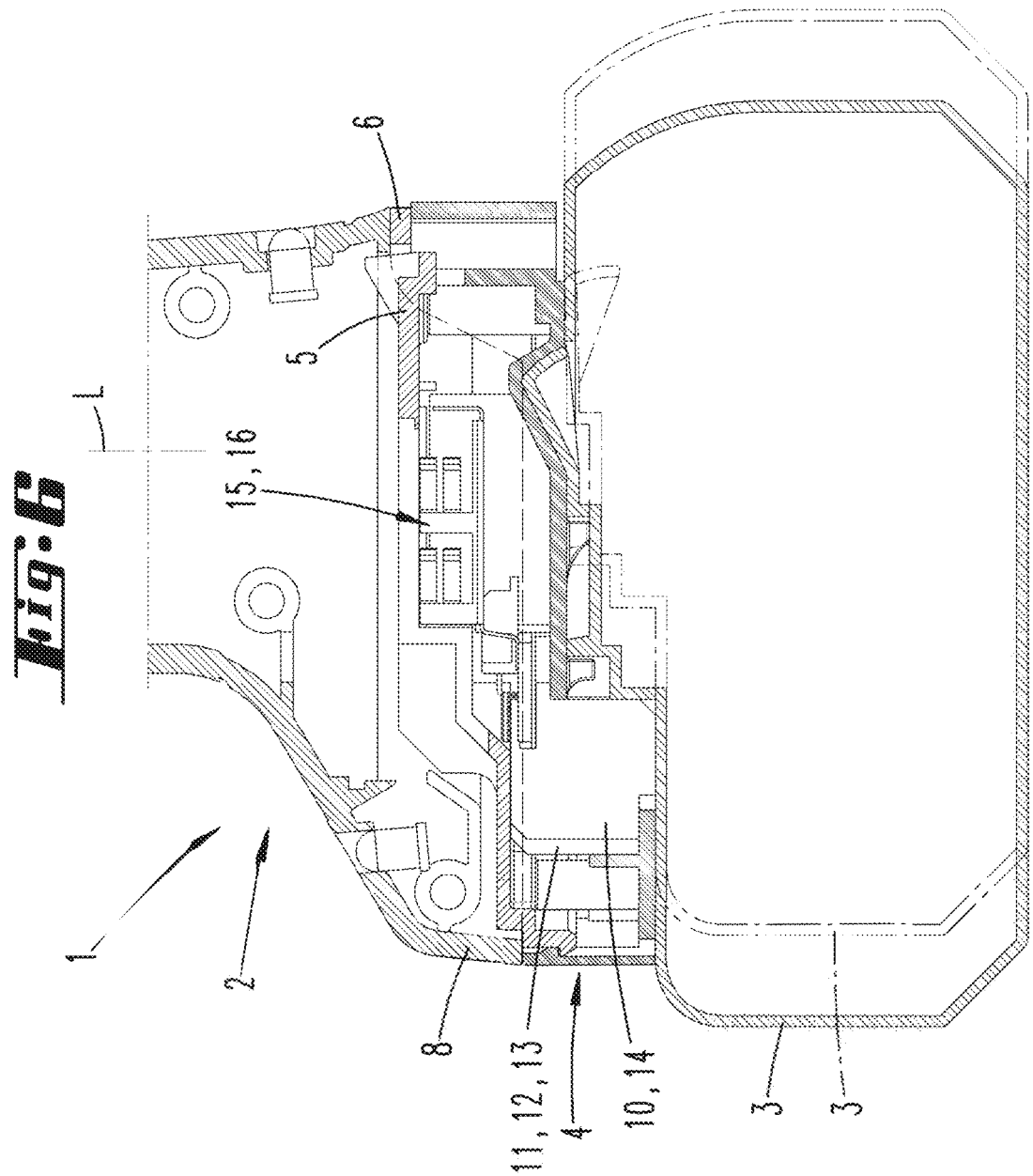
FIG. 6 is a cross section through the device base according to FIG. 3 in the area of the adapter.
Figure 7:
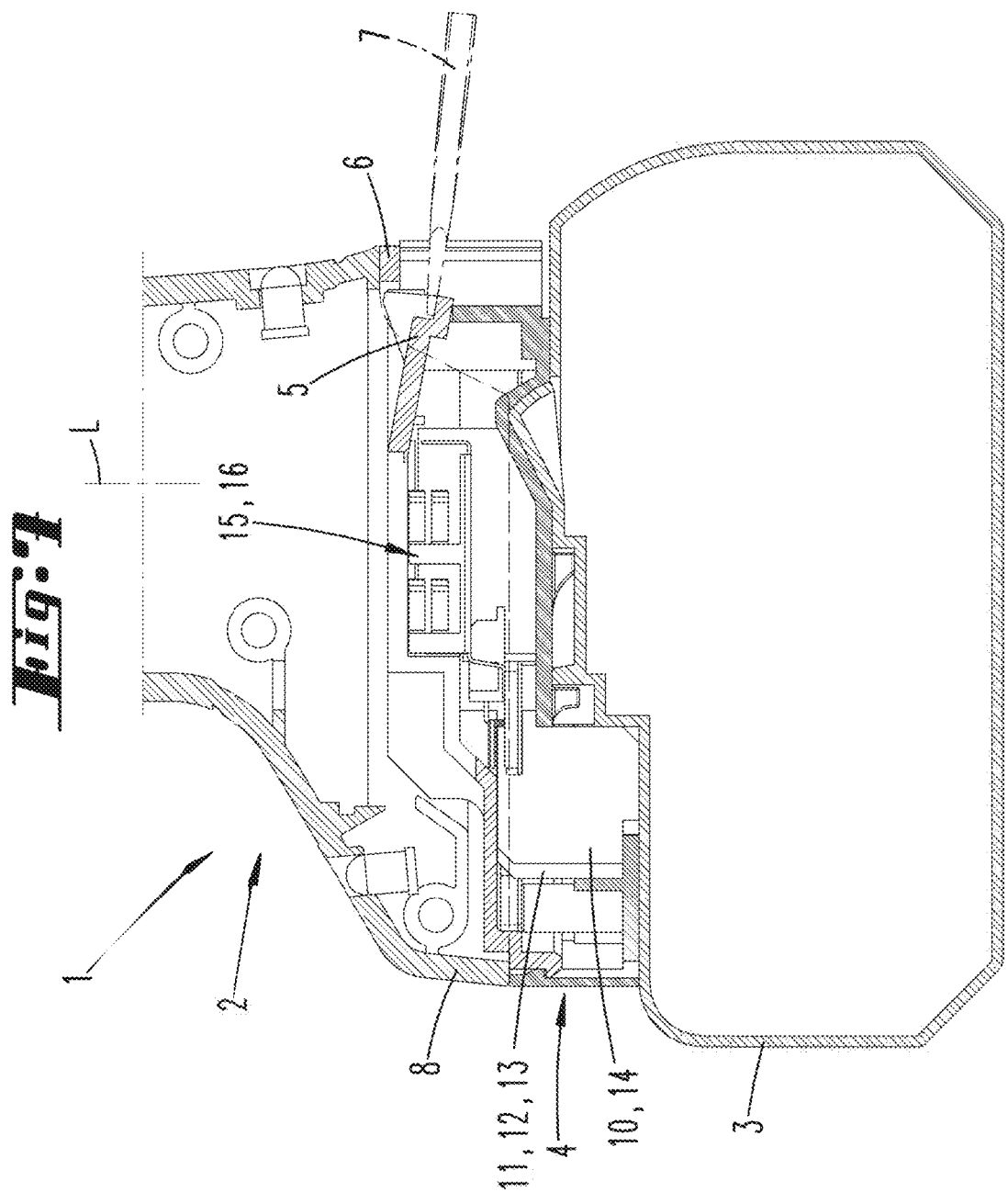
FIG. 7 is a clarification of the possible release of the latched connection between the adapter and device shaft.
Figure 8:
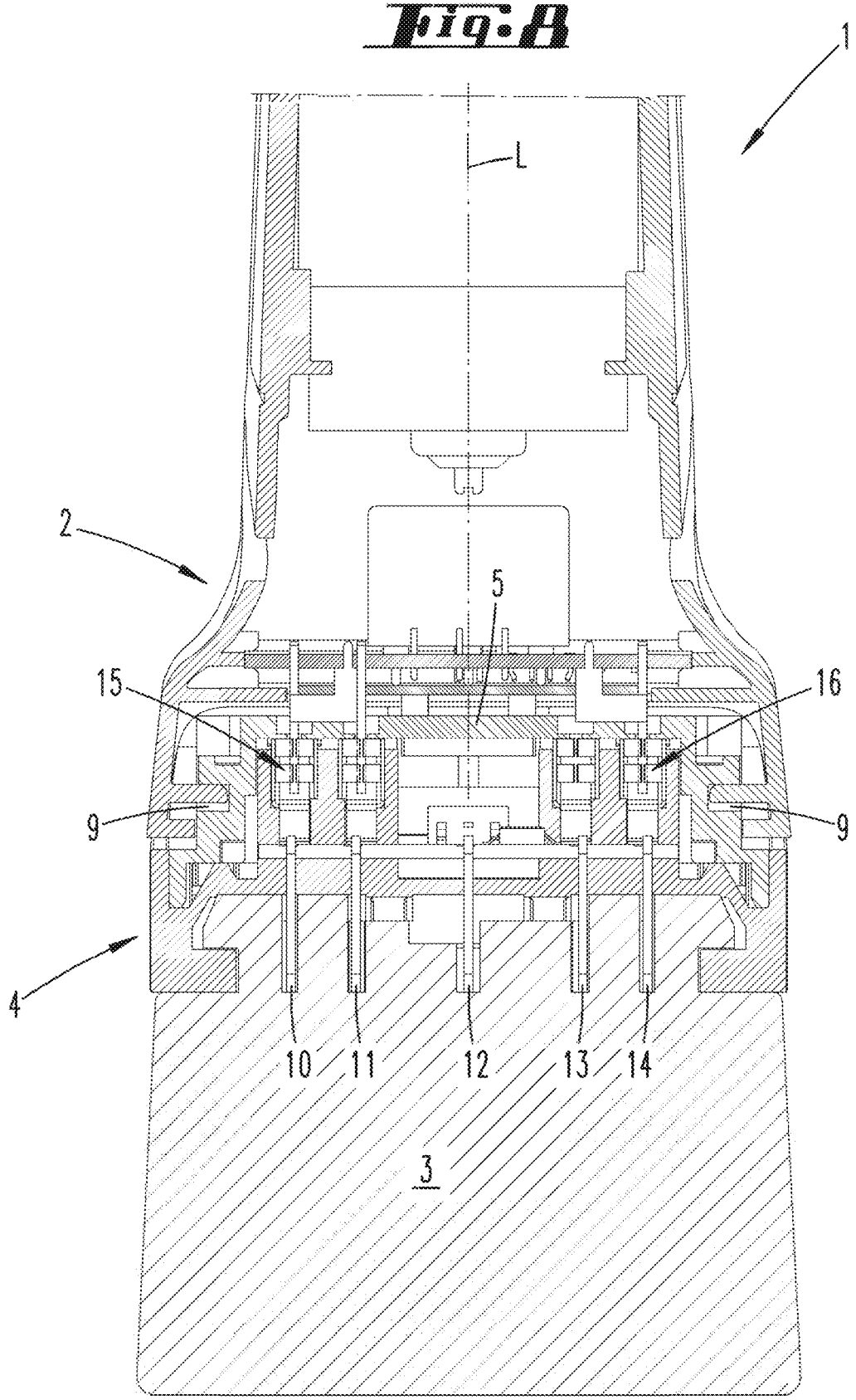
FIG. 8 is a cross section according to FIG. 6, but turned by 90° relative to a longitudinal device shaft axis.

The adapter 4 can be latched with the device shaft 2, as may be gleaned in further detail from FIGS. 6 and 7. In order to be able to establish a latched connection between the device shaft 2 and adapter, the adapter 4 preferably incorporates a detaching part, which in the exemplary embodiment is a latching part 5 that can here give way downwardly when exposed to a spring force. The latching part 5 is inwardly displaced in relation to an outer wall 6 of the adapter 4. Therefore, engagement into the interior of the adapter 4 is necessary to actuate the latching part 5. In the embodiment on FIG. 6, the outer wall 6 is continuous in design. Once here latched in, the adapter 4 cannot be detached again without destroying the outer wall 6. The outer wall 6 also exhibits a door or latching opening.

As evident from FIG. 7, if the outer wall 6 is not continuous in design, the latching part 5 can potentially also be actuated with a tool, such as a screwdriver 7 only partially shown here.

The adapter 4 depicted here is a slide-in adapter. The latter is slide-connected with the device shaft 2 at essentially a right angle to a longitudinal axis L of the device shaft 2. A front cover wall 8 of the device shaft here constitutes a slide stop. In addition, the interior of the device shaft is preferably provided with projections, which interact with recesses 9 in the adapter, thereby yielding a rail-like convergence. The latching part 5 is thus the only movable part required to anchor the adapter 4 to the device shaft 2. Also possible as an alternative is a configuration as a tower adapter (not shown). The latter is joined with the device in the longitudinal direction of the device shaft 2, usually through insertion into a receiving space formed on the device shaft.

Figure 5:
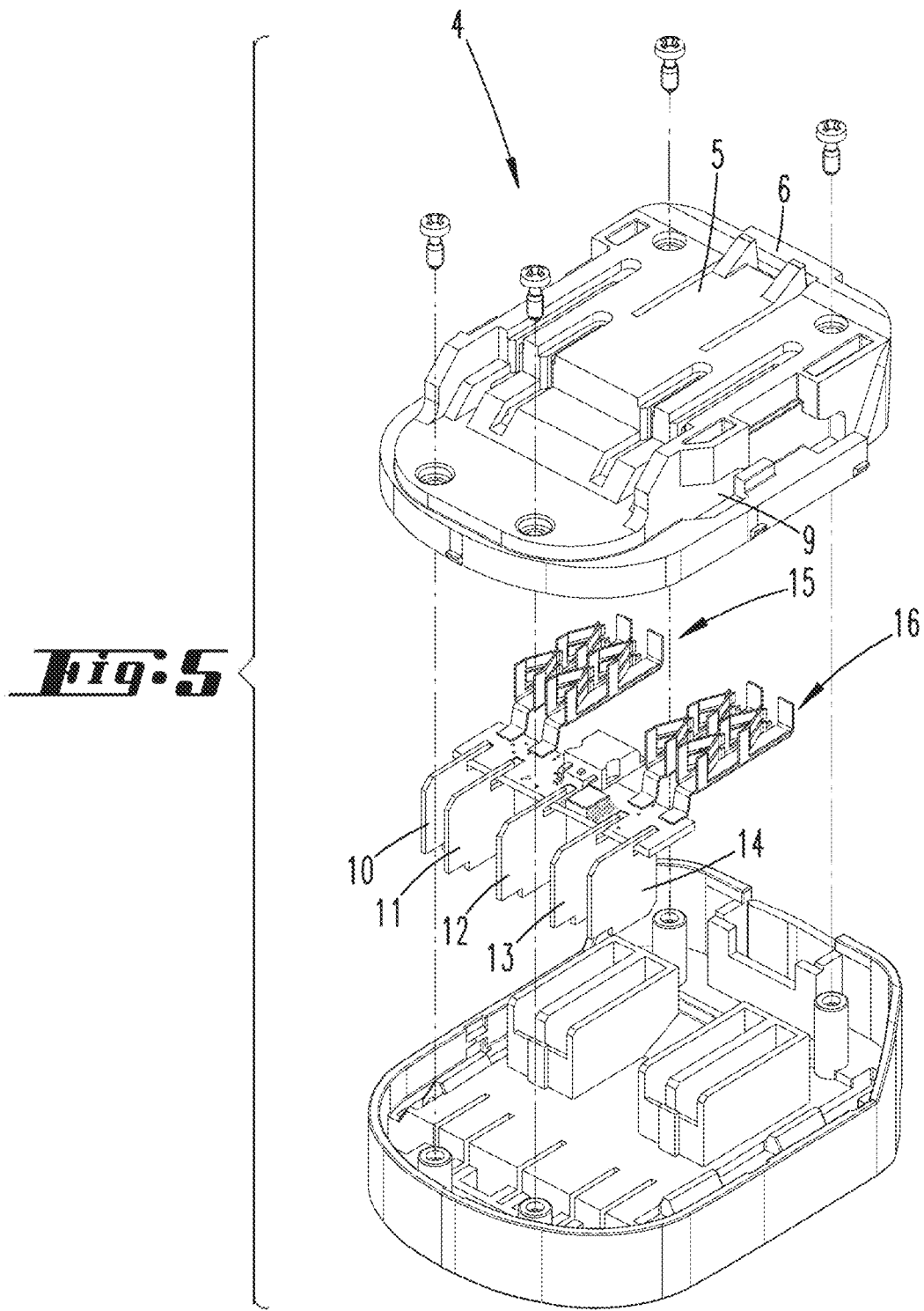
FIG. 5 is an exploded view of an adapter.

As may be gleaned in particular from FIG. 5, which presents an exploded view of the adapter, the interior of the adapter 4 incorporates electrical contacts 10 to 14, which in a plugged-in state project downwardly into corresponding contacts of the accumulator. The electrical currents are transmitted to the upper side of the adapter 4, which accommodated corresponding contact elements 15, 16. Not just a plus and minus transmission is here possible, but also a conveyance of values relating to temperature and/or charging status and/or other data queried in the accumulator. Conventional accumulators make such values available at corresponding contacts.

Figure 9:
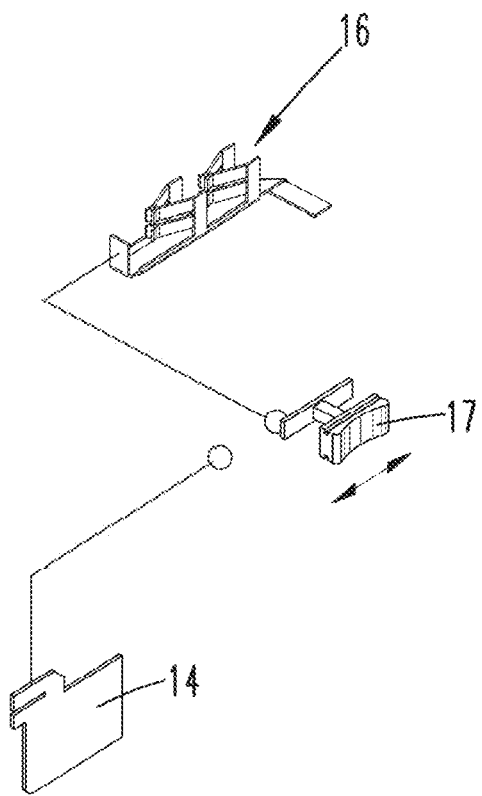
FIG. 9 is a diagrammatic view of an electrical circuit incorporated in the adapter to interrupt the power.

In addition, it can be provided that it be possible to interrupt a power supply inside the adapter 4, specifically by way of a switch 17, as evident from the electrical circuit shown on FIG. 9. The switch 17 can either be automatically actuated, e.g., in the device, in a microprocessor or the like, by comparing permissible data with a measured temperature or some other measured datum inside the adapter and/or by initially transmitting the values into the device, and interrupting the power or not as a function hereof. The switch can also be manually activatable.

It can further be provided (not shown in any detail) that the adapter be designed to output a signal, for example a light and/or audio signal.

Figure 10:
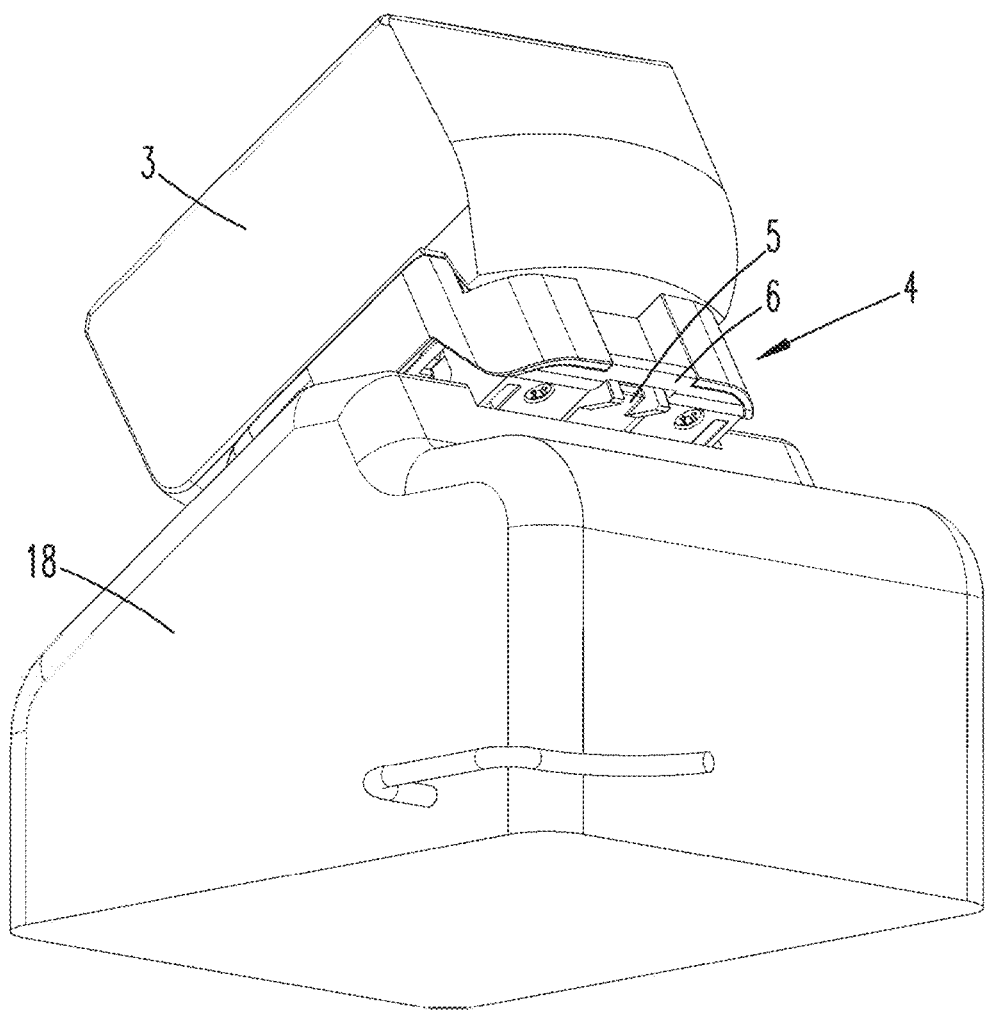
FIG. 10 is a combination of an adapter and an accumulator placed on a charging device.
Figure 11:
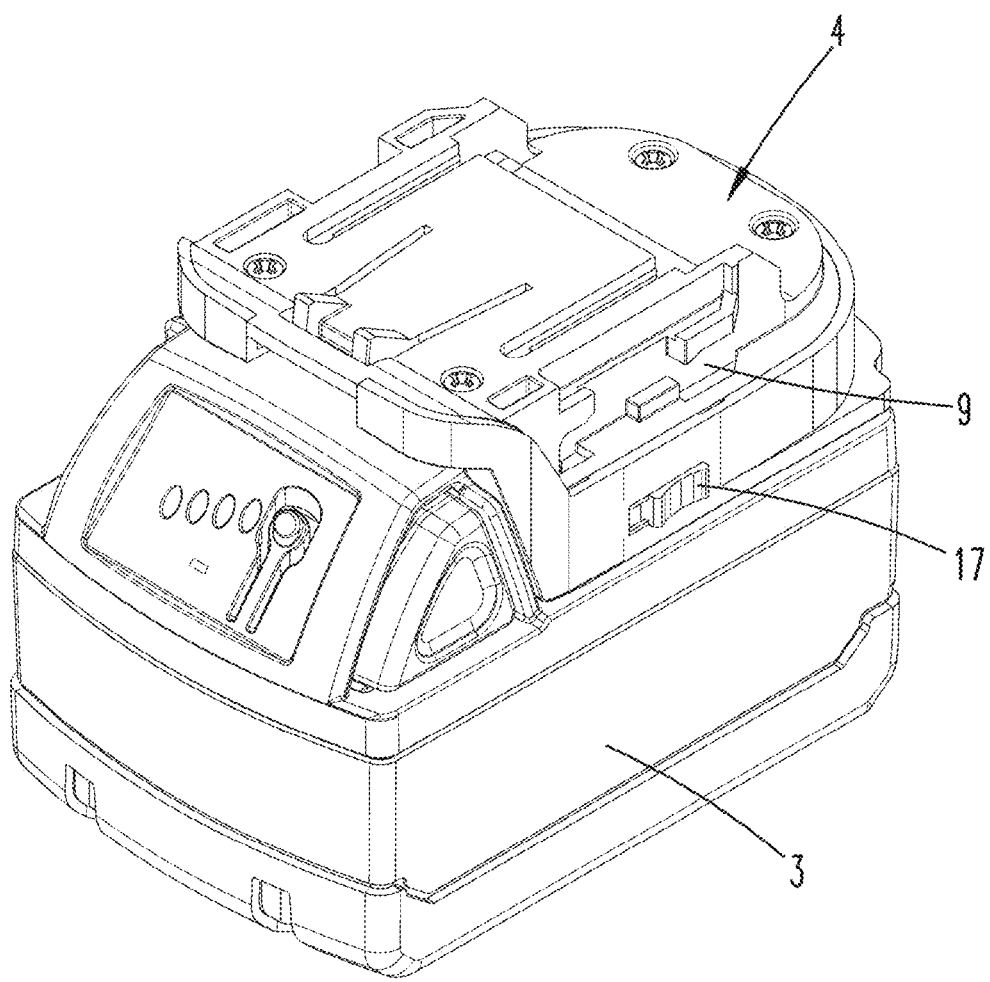
FIG. 11 is a combination of a second type of accumulator with an adjusted adapter.
Figure 12:
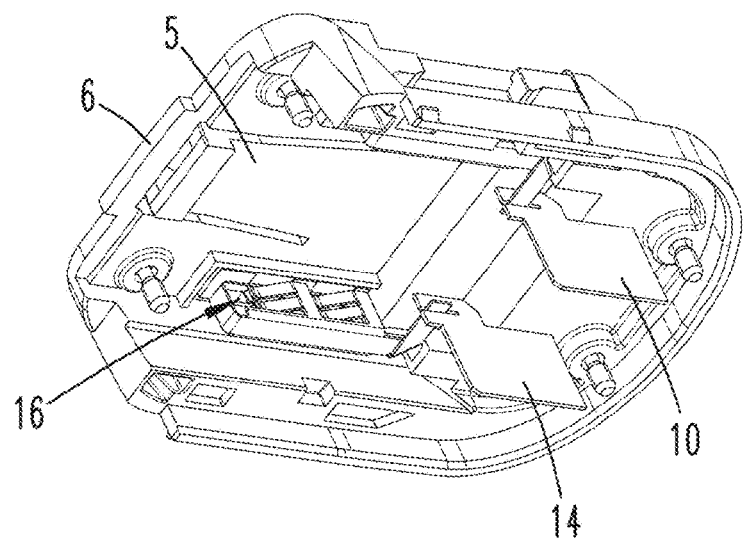
FIG. 12 is a second type of adapter, shown in an exploded view with regard to its two-part structure.
Figure 13:
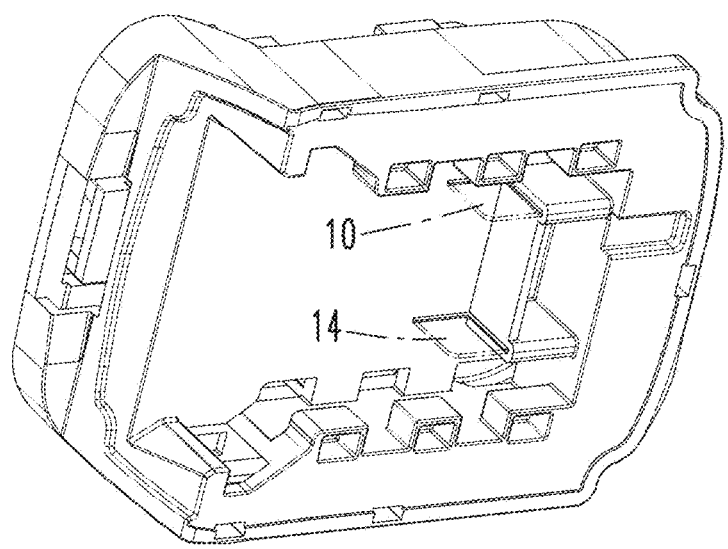
FIG. 13 is a second type of accumulator, shown in an exploded view with regard to its two-part structure.

The accumulator 3 can also be charged together with a plugged-in adapter 4, as depicted on FIGS. 9 and 10, for example. A charging device 18 is here connected to the accumulator 3 via the adapter 4 for charging purposes. This is possible in particular because the adapter 4 in this embodiment exhibits more electrical transmission contacts than just the two electrical contacts required for supplying electrical power, specifically to also include electrical transmission contacts involving the temperature of the accumulator and/or charging status of a charging cell in the accumulator, etc.

Data can also be solely or additionally transmitted optically, magnetically, by radio, or mechanically.

All disclosed features are (in and of themselves) essential to the invention. The disclosure of the application hereby also includes the contents disclosed in the accompanying/attached priority documents (copy of the earlier application) in its entirety, also for purposes of incorporating features from these documents into claims of the present application. In their optional equivalent wording, the subclaims describe independent inventive further developments of prior art, in particular to submit partial applications based upon these claims.

REFERENCE LIST

1 Tool
2 Device shaft
3 Accumulator
4 Adapter
5 Latching part
6 Outer wall
7 Screwdriver
8 Cover wall
9 Recess
10 Electrical contact
11 Electrical contact
12 Electrical contact
13 Electrical contact
14 Electrical contact
15 Contact element
16 Contact element
17 Switch
18 Charging device
20 Crimping head
L Longitudinal axis

The invention claimed is:

1. A method of operating a hydraulically or electric motor operated tool comprising:
providing a device shaft having a wall and at least first and second electrical contacts;
providing an accumulator, the accumulator having an adapter comprising a wall thereon;
latching the adapter to the device shaft by a latching part, wherein the wall of the device shaft and the wall of the adapter are proximate to each other and form an internal cavity when the device shaft and the adapter are connected together, the latching part being positioned entirely within the internal cavity such that the latching part is completely hidden from view by the walls of the connected together device shaft and adapter; and
engaging a tool with the latching part thereby detaching the adapter from the device shaft, whereupon during engagement of the tool with the latching part, the wall of the adapter is destroyed.

2. The method according to claim 1, further comprising:
acquiring values relating to temperature and/or charging status of the accumulator by using contacts provided on the adapter; and
transmitting the values by using contacts provided on the adapter.

3. The method according to claim 1, further comprising: interrupting a power supply to the tool by using the adapter.

4. The method according to claim 1, further comprising: automatically actuating a power switch of the accumulator as a function of a condition datum of the accumulator.

5. The method according to claim 1, further comprising: automatically actuating a power switch of the accumulator as a function of a temperature and/or a charging status of the accumulator.

6. The method according to claim 1, further comprising: charging the accumulator with a plugged-in adapter, wherein the accumulator is connected with a charging device via the adapter.

7. The method according to claim 1, further comprising: outputting a signal from the adapter.

8. The method according to claim 7, wherein the signal is a light and/or audio signal.

9. The method according to claim 1, wherein the hydraulically or electric motor operated tool is a crimping device.

10. A hydraulically or electric motor operated tool comprising:
a device shaft having a wall and at least first and second electrical contacts;
an adapter comprising a wall;
an accumulator connected to the adapter; and
a latching part configured to connect the device shaft and the adapter together,
wherein the latching part can be released by engagement of a tool with the latching part, and
wherein the walls of the device shaft and the adapter are proximate to each other and form an internal cavity when the device shaft and the adapter are connected together, the latching part being positioned entirely within the internal cavity such that the latching part is completely hidden from view by the walls of the connected together device shaft and adapter, and wherein the wall of the adapter is destroyed when the latching part is engaged with the tool in order to detach the adapter from the device shaft.

11. The hydraulically or electric motor operated tool according to claim 10, the adapter further comprising contacts configured to acquire values relating to temperature and/or charging status of the accumulator, the contacts capable of transmitting the values.

12. The hydraulically or electric motor operated tool according to claim 10, wherein the adapter is capable of interrupting a power supply to the hydraulically or electric motor operated tool.

13. The hydraulically or electric motor operated tool according to claim 10, wherein the accumulator has a power switch.

14. The hydraulically or electric motor operated tool according to claim 13, wherein the power switch automatically actuates as a function of a condition datum of the accumulator.

15. The hydraulically or electric motor operated tool according to claim 13, wherein the power switch actuates as a function of a temperature and/or a charging status of the accumulator.

16. The hydraulically or electric motor operated tool according to claim 10, wherein the accumulator can be charged with a plugged-in adapter, wherein the accumulator is connected with a charging device via the adapter.

17. The hydraulically or electric motor operated tool according to claim 10, wherein the adapter is capable of outputting a signal.

18. The hydraulically or electric motor operated tool according to claim 17, wherein the signal is a light and/or audio signal.

19. The hydraulically or electric motor operated tool according to claim 10, wherein the hydraulically or electric motor operated tool is a crimping device.

20. The hydraulically or electric motor operated tool according to claim 10, wherein the wall of the adaptor is continuous.

21. The hydraulically or electric motor operated tool according to claim 10, further in combination with a tool which is used to engage the latching part.

* * * * *